United States Patent [19]

Shaw et al.

[11] Patent Number: 4,667,737
[45] Date of Patent: May 26, 1987

[54] SEALING APPARATUS

[75] Inventors: James G. Shaw, Oklahoma City; John H. Shore, Shawnee, both of Okla.

[73] Assignee: Baker Oil Tools, Inc., Orange, Calif.

[21] Appl. No.: 861,553

[22] Filed: May 9, 1986

[51] Int. Cl.<sup>4</sup> .......... E21B 41/00; F16J 15/40; F16J 15/54

[52] U.S. Cl. .................... 166/104; 277/135

[58] Field of Search ........... 166/104, 105, 68, 242; 277/135; 175/104, 107; 417/424, 366

[56] References Cited

U.S. PATENT DOCUMENTS

| | | | |
|---|---|---|---|
| 1,893,921 | 1/1933 | Wintroath | 277/135 X |
| 2,305,648 | 12/1942 | Van Horn | 277/135 X |
| 2,354,874 | 8/1944 | Myers | 277/135 X |
| 2,379,648 | 7/1945 | Myers | 277/135 X |
| 2,881,013 | 4/1959 | Myers | 277/135 X |
| 3,889,983 | 6/1975 | Frieze et al. | 277/135 X |
| 4,260,167 | 4/1981 | Fox | 175/107 X |

Primary Examiner—Stephen J. Novosad
Attorney, Agent, or Firm—Norvell & Associates

[57] ABSTRACT

A sealing apparatus having particular utility in a submersible electric motor utilized in subterranean wells comprises a tubular housing assembly securable in upwardly projecting, sealed relationship to the motor housing. An extension of the motor shaft projects upwardly through the tubular housing to drive a pump or other subterranean well tool. The upper end of the extension shaft is exposed to well fluids and a first shaft seal is mounted in a seal mounting chamber defined in the upper end of the tubular housing assemblage. Below the seal mounting chamber, the tubular housing assemblage defines a diaphragm chamber. A conduit is provided between the lower portions of the seal mounting chamber and the lower portions of the diaphragm chamber. A flexible, annular diaphragm divides the diaphragm chamber and is exposed on its exterior to well fluids, and on its interior to a light density motor protective fluid, thus equalizing any pressure differential between the motor protective fluid and the external well fluids. The diaphragm chamber is connected at its upper end to a downwardly extending axial passage surrounding the motor shaft and communicating with the interior of the motor housing.

5 Claims, 2 Drawing Figures

SEALING APPARATUS

BACKGROUND OF THE INVENTION

1. Field of the Invention

The invention relates to a sealing apparatus for a submersible electric motor, and particularly a motor employed to drive a pump in a subterranean well.

2. History of the Prior Art

Electric motors have long been utilized to pump well fluids from subterranean wells. Normally, the motor and pump are located at substantial distances below the surface and are surrounded by well fluids. Since the well fluids to be pumped must penetrate the housing of the pump, it is unavoidable that the well fluids will come into contact with the shaft connecting the electric motor and the driven pump. Shaft seals in a large variety of configurations have been employed to prevent the leakage of well fluids downwardly along the shaft and into the motor housing, thus destroying the electrical insulation necessarily provided for the motor windings. Additionally, it is common practice to fill the interior of the motor housing with a high dielectric protective oil and this same oil has been provided in surrounding relationship to the shaft seals and bearings to absorb heat that is necessarily developed in the normal operation of the motor. When such protective fluid is employed, care must be taken to equalize the pressure of the confined protective fluid with that of the well fluids surrounding the motor for the reason that the existence of a substantial pressure differential in either direction will greatly contribute to leakage of the protective fluid of the motor enclosure, or worse, leakage of the well fluids into the motor housing.

To provide such pressure equalization, the prior art has resorted to the use of diaphragms which are disposed intermediate the motor protective fluid and the well fluid to achieve constant equalization of pressures therebetween through the expansion or contraction of the flexible diaphragm. Even this precaution does not preclude eventual leakage of well fluids into the interior of the motor housing resulting in a substantial reduction in the useful life of the downhole electric motor.

SUMMARY OF THE INVENTION

The invention provides a sealing apparatus for a downhole electric motor of the type employed for driving pumps in a subterranean well. Such sealing apparatus comprises a tubular housing assembly sealably attachable to the downhole motor housing and extending upwardly in concentric relationship to an extension shaft connected to the driving shaft of the motor and utilized to drive a pump. At the upper end of the tubular housing assembly, a seal mounting chamber is defined and within such chamber a double acting shaft seal is disposed to minimize leakage of well fluids downwardly along the shaft surface. The seal mounting chamber is connected by downwardly extending passages to the lower portions of an annular diaphragm chamber which is defined between a tube surrounding the motor extension shaft in radially spaced relationship and the inside surface of the outer tubular wall of the tubular housing assembly. Within this diaphragm chamber, a flexible annular rubber diaphragm is centrally and sealably mounted. Radial ports are provided at the upper end of the diaphragm chamber in the inner tube, thus providing fluid communication between the inner diaphragm chamber and an annular axial passage extending downwardly and communicating with the interior of the motor housing.

The seal mounting chamber and the inner diaphragm chamber are filled with motor protective fluid concurrently with the filling of the motor housing with such fluid. The external surface of the flexible diaphragm is exposed to well fluids. Thus, any pressure differentials existing between the motor protective fluid and the well fluids are absorbed by contraction or expansion of the flexible diaphragm.

In the event of leakage of the well fluid past the first of the double shaft seals, such well fluids, being heavier than the motor protective fluid, will flow by gravity to the bottom of the inner diaphragm chamber. They will be trapped in such chamber until the level of leakage well fluids reaches the ports disposed at the top of the diaphragm chamber, hence cannot flow downwardly into the motor housing until such level is reached.

In a preferred embodiment of this invention, the downwardly extending, annular passage around the extension shaft communicates with a labyrinth chamber which is defined between a second tube, which surrounds the shaft extension in radially spaced concentric relationship, and the inner surface of an outer tubular element of the housing assemblage. A downwardly extending fluid passage communicates from the first mentioned downwardly extending annular passage around the shaft to the bottom portion of the labyrinth chamber. Fluid can exit from the labyrinth chamber only through radial port means provided at the top of such passage which communicate with the top of the second axially extending passage which communicate through a tube to the bottom of a second labyrinth chamber. Fluid can exit from the second labyrinth chamber only through radial port means provided at the top of such chamber which communicate with the top of another downwardly extending annular passage surrounding the extension shaft. From there, fluid communication is provided through the bearings for the shaft extension and thence downwardly into the interior of the motor housing. Thus, a substantial amount of well fluids must leak past the first of the double shaft seals so as to fill both the diaphragm chamber and the labyrinth chamber before gaining access to the downwardly extending axial passage leading to the interior of the motor housing. The time required for this significantly large quantity of well fluid leakage to make its way past the first of the double shaft seals and the two labyrinth passages respectively defined in the diaphragm chamber and the labyrinth chamber, is substantially increased, thereby increasing the useful life of the motor by protecting the windings thereof from contact with well fluids.

Further advantages of the invention will be readily apparent to those skilled in the art from the following detailed description, taken in conjunction with the annexed sheets of drawings, on which is illustrated a preferred embodiment of the invention.

DESCRIPTION OF PREFERRED EMBODIMENT

Figure 1A:
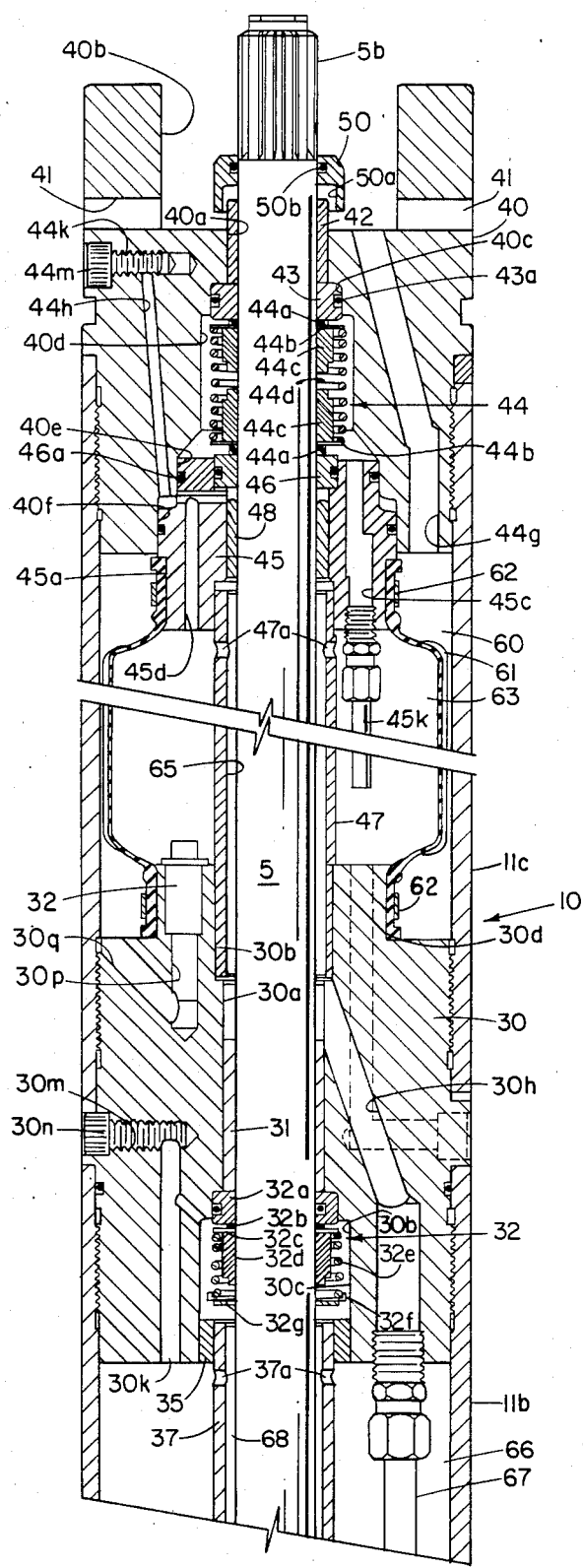
FIGS. 1A an 1B collectively represent a schematic vertical sectional view of a sealing apparatus embodying this invention, FIG. 1B being a vertical continuation of FIG. 1A.
Figure 1B:
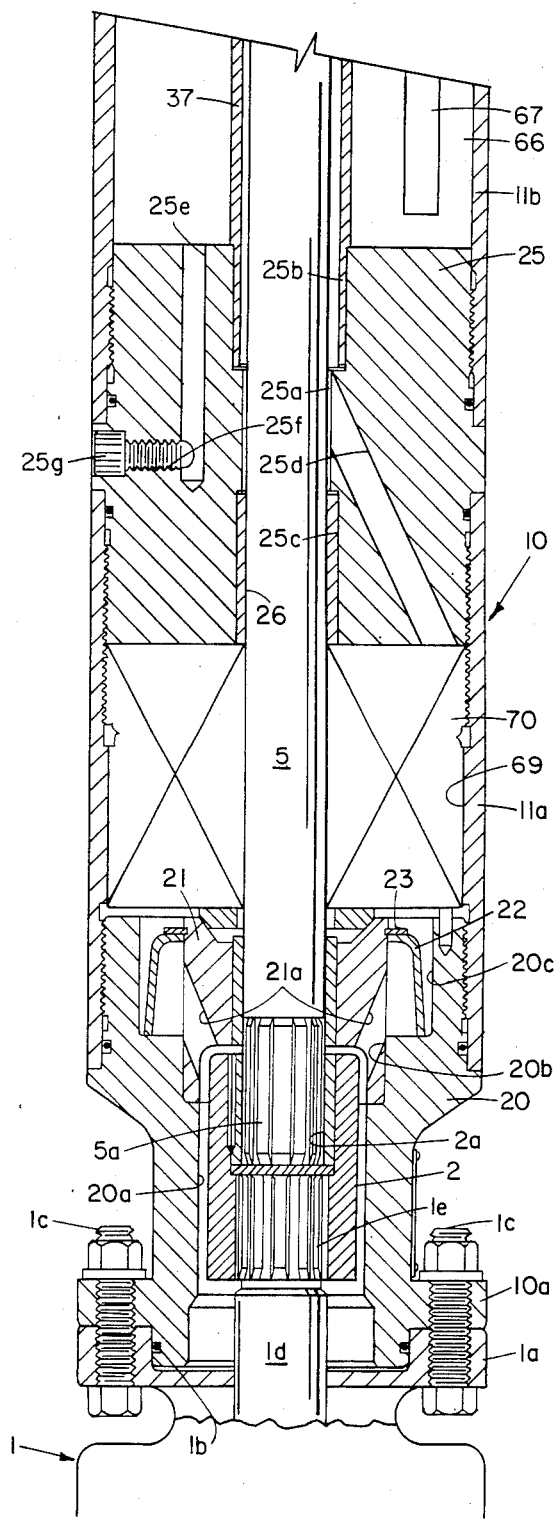

A sealing apparatus for a submersible motor embodying this invention comprises a tubular housing assembly 10 which is sealably attached to the top end of the housing 1 of any conventional submersible electric motor, the details of which are not shown. An end flange 1a on such motor housing mates with a flange 10a provided on the bottom of the tubular housing assemblage 10, and bolts 1c clamp such flanges together. An O-ring 1b effects a seal of the connection. The motor shaft 1d is provided with splines 1e which engage corresponding splines provided in the lower end of a coupling 2. The upper end of coupling 2 has an internally splined sleeve 2a press fitted therein which receives the splined bottom end 5a of a motor shaft extension 5 which projects upwardly in concentric relationship to the tubular housing assembly 10 and terminates in a splined end 5b which is connectable by conventional apparatus to a subterranean well pump (not shown).

The tubular housing assemblage 10 comprises a plurality of outer thin-walled tubular elements 11a, 11b, and 11c which are respectively internally threaded at both ends and threadably engagable with a bottom connecting housing 20, a lower guide housing 25, an upper guide housing 30 and a shaft seal housing 40. The shaft seal housing 40 defines a bore 40a surrounding the upper portions of the motor extension shaft 5. A sleeve bearing 42 is snugly mounted in the bore 40a and the upper end of sleeve bearing 42 projects above the bottom of a counter bore 40b to cooperate with the internal bore 50a of a slinger element 50 which is sealably mounted on the motor extension shaft 5 by an O-ring 50b. Radial ports 41 are provided between the counter bore 40b and the exterior of the tubular housing assembly 10, thus permitting well fluids to surround the slinger 50 and the upper end of the sleeve bearing 42. Slinger 50 prevents particulates from settling in the bearing clearance between shaft extension 5 and sleeve bearing 42.

Upper seal housing 40 further defines a series of downwardly opening, successively larger counter bores 40c, 40d, 40e and 40f. The counter bore 40c slidably mounts a seal backup ring 43 which has an O-ring 43a engaging the counter bore 40c.

The counter bore 40d defines a larger diameter annular chamber within which is mounted a conventional double shaft seal unit 44. Shaft seal unit 44 incorporates an upper elastomeric seal ring 44a which is compressed into sealing engagement with the surface of extension shaft 5 and the adjacent surface of the backup ring 43 by a seal compression unit including a compression ring 44b, a spring guide 44c and a compression spring 44d. Identical elements are provided at the lower end of the double shaft seal unit 44 and effect the compression of a second elastomeric seal ring 44a by spring 44d against a seal support ring 46 which is sealably supported in an adaptor housing 45 by an O-ring 46a. Adaptor housing 45 is press fitted to the top of an upper guide tube 47, the lower end of which is press fitted in a counter bore 30b provided in the bore 30a of the upper guide housing 30. A second sleeve bearing 48 surrounds shaft 5 between lower seal support ring 43 and the top end of upper guide tube 47.

It should be recognized that any type of shaft seal may be mounted in the counter bore 40d and that the specific double seal unit 44 shown in the drawings represents only one of a large number of conventional structures that can be utilized at this point to effectively reduce leakage of well fluids downwardly along the exterior of the extension shaft 5.

The exterior of the upper guide tube 47 cooperates with the internal bore surface of the uppermost outer tubular housing section 11c to define an annular chamber 60. The central portions of chamber 60 are employed as an expansion chamber by clamping the end portions of a flexible annular diaphragm 61 to the lower portion 45a of the adaptor housing 45 and an upwardly projecting cylindrical portion 30d of the upper guide housing 30. Conventional hose clamps 62 may be employed for this purpose. The flexible diaphragm 61 is formed from rubber or any other suitable elastomeric material that is not affected by well fluids.

An axially extending passage 44g is provided in the seal mounting housing 40 connecting the upper counter bore 40b and hence the well fluids to the outer portions of the expansion chamber 60. Additionally, an axial passage 45c is provided in the adaptor housing 45 which extends from the lower end of the counter bore 40d in which the shaft seal unit 44 is mounted, to the inner expansion chamber 63 enclosed by the flexible diaphragm 61. Additionally, an extension tube 45k is mounted in the lower end of the passage 45c so that fluid coming through such passage is discharged adjacent the lower end of the inner expansion chamber 63.

A third axial passage 45d is provided in the guide adaptor 45 connecting the top of the inner expansion chamber 63 with an axially extending passage 44h which leads upwardly to a venting port 44k which is normally closed by a threaded plug 44m. As will be later described, the internal chamber 63 defined by the flexible diaphragm 61, as well as the seal mounting chamber defined by counter bore 40d is filled with a high dielectic strength oil which is of substantially lighter density than well fluids. Accordingly, any well fluids leaking through the shaft seal unit 44 will be deposited by passage 45c and extension tube 62 adjacent to the lower portions of the chamber defined by the flexible diaphragm 61. It follows that such well fluids cannot flow out of the chamber until sufficient fluids have collected to reach the elevation of the radial outlet ports 47a provided in upper guide tube 47 adjacent the upper end of the expansion chamber defined by the diaphragm 61. Moreover, any differences in pressure between the well fluids and the motor protective fluid will be equalized by contraction or expansion of the diaphragm 61, as the case may be.

The upper guide tube 47 defines a downwardly extending annular passageway 65 which could, if desired, lead directly into the interior of the motor housing. In accordance with the preferred embodiment of this invention, the downwardly extending axial passage 65 is instead sealed off within the upper guide housing 30. A sleeve bearing 31 and a shaft seal unit 32 are mounted in a counter bore 30b provided in the bottom end of the upper guide housing 30. The shaft seal unit 32 may constitute any conventional shaft seal unit and here is shown as comprising a backup ring 32a, an elastomeric sealing element 32b, a seal compressing ring 32c, a spring guide 32d, a spring 32e and a spring backup ring 32f. A C-ring 32g secures the backup ring 32f to the shaft extension 5.

In the lower portion of the counter bore 30b of the upper guide housing 30, a mounting ring 35 and a lower guide tube 37 are mounted by a press fit. Guide tube 37 cooperates with the inner wall of the outer housing element 11b to define a labyrinth chamber 66. An axially extending bypass passage 30h is provided in the upper guide housing 30 which communicates between the lower end of the downwardly extending annular passage 65 and the labyrinth chamber 66. An extension tube 67 is mounted in the lower end of the bypass passage 30h so as to deposit any fluid flowing through such passage in the lower portions of the labyrinth chamber 66. Fluid can only exit from labyrinth chamber 66 through a plurality of radial ports 37a provided in the upper end of the lower guide tube 37. It necessarily follows that leakage well fluids must fill substantially the entire labyrinth chamber 66 before they would rise to a level permitting them to flow downwardly through the annular passage 68 defined between the inner wall of the lower guide tube 37 and the outer surface of the shaft extension 5. A vent passage 30k extends upwardly from chamber 66 to a radial port 30m which is normally closed by a plug 30n.

The lower guide tube 37 is supported by being press fitted into a counter bore 25b provided in the central bore 25a of the lower guide housing 25. A downwardly opening counter bore 25c provides a mounting for still another sleeve bearing 26.

The lower guide housing 25 is provided with an axially extending bypass passage 25d communicating with the annular passage 68 at its upper end and at its lower end with a thrust bearing chamber 69 defined by the internal surface of the lower tubular element 11a of the tubular housing assembly 10. Additionally, a venting or filling passage 25e is provided in the housing 25 communicating with a radial port 25f which is closed by a threaded plug 25g.

A conventional thrust bearing unit 70 is mounted in the thrust bearing chamber 69. Since such thrust bearing forms no part of the present invention, it is shown only schematically. Suffice it to say that the thrust bearings are provided with fluid passages permitting the motor protective fluid to completely surround the thrust bearings to provide not only lubrication but also absorption of any heat resulting from the operation of the bearings.

The lower portion of the thrust bearing chamber 69 is in direct communication with a large upwardly opening counter bore 20c provided in the bore 20a of the connection housing 20. The counter bore 20c has a fluid guide block 21 press fitted therein and such guide block provides axially extending fluid passages 21a communicating between the counter bore 20c and the annular space defined between bore 20a and the exterior of the connecting sleeve 2. An annular porous metal filter 22 is mounted in overlying relatiosnhip to the upper end of the passages 21a. Filter 22 is secured in position by a snap ring 23 which is secured to the upper end of the guide block 21. Thus, any particulates contained in fluid moving downwardly toward the motor housing 1 are removed from the downwardly moving stream by the porous metal filter 22.

The operation of the aforedescribed sealing apparatus should be apparent to those skilled in the art from the foregoing description. The motor housing 1 and the interconnected chambers 20c, 69, 66, 63 and 40d of the tubular housing assembly are filled with the motor protective fluid, generally by forcing such fluid into the motor housing 1 and causing it to rise upwardly, with the vent plugs 44m, 33g, 25g and 30n removed to permit the venting of any trapped air. Obviously, as the level of such fluid rises to the level of the vent plugs, the vent plugs are reinserted.

To facilitate the release of pressure produced by the heating of the motor protective fluid after the initial fillup, an axial passage 30p is provided in upper guide housing 30 having its upper end communicating with the internal diaphragm chmaber 63. A downwardly inclined passage 30q connects the lower end of axial passage 30p to that portion of chamber 60 exposed to well fluids. A check valve 32 is mounted in the top portions of axial passage 30p to permit only outward flow of the motor protective fluid to discharge the expansion of such fluid produced during initial heat up or by any other pressure build up of the motor protective fluid which cannot be equalized with well fluid pressure by the diaphragm 61.

Well fluids are in contact with the extension shaft 5 only at the upper end thereof and can only flow downwardly along such shaft by leakage through the sleeve bearing 42 and the double seal 44. Any such fluid leakage moves by gravity through the downwardly extending passage 45c and extension tube 45k into the bottom portions of the inner expansion chamber 63. The well fluids cannot move out of the expansion chamber 63 until such chamber is substantially full of well fluids, following which the leakage well fluids can flow down the annular downwardly extending passage 65 into the axially extending passage 30h and through the tube 67 into the bottom of the labyrinth chamber 66. Again, leakage well fluids can only escape from labyrinth chamber 66 by filling such chamber to the level of the radial ports 37a from which they can flow downwardly to the motor housing 1 through the annular passage 68, chamber 69 and passages 21a, but may pass through the porous metal filter 22 before they reach the interior of the motor housing.

It is therefore apparent that a substantial amount of time would be required for the very significant amount of leakage fluid to be collected in the sealing apparatus so as to permit it to gain access to the interior of the motor housing.

At the same time, pressure differentials between the motor protective fluids and the well fluids are completely neutralized by the action of the flexible diaphragm 61. All heat generated by the operation of the various seals and bearings is absorbed by the motor protective fluid and, as mentioned, any pressure increase due to such temperature rise is readily absorbed by the flexible diaphragm 61.

It follows that the useful life of a downhole subterranean well motor employing a sealing apparatus embodying this invention is significantly increased due to the substantial isolation of the motor windings from well fluids over a long period of time, even though some leakage through the seals of the apparatus may occur.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. Sealing apparatus for a downhole well motor having a shaft extension projecting upwardly out of the motor housing containing the motor windings, comprising, in combination:
   a tubular housing surrounding the motor shaft extension and having a lower portion sealingly securable to said motor housing;
   said tubular housing assembly defining an annular seal mounting chamber in its upper end;
   a shaft seal disposed in said seal mounting chamber to prevent well fluid leaking down said shaft into said chamber;
   said tubular housing assembly further defining an annular diaphragm chamber below said shaft seal mounting chamber;
   a flexible annular diaphragm sealingly mounted adjacent the outer periphery of said annular diaphragm chamber, thereby defining a fluid expansion chamber within said flexible diaphragm,
   axially extending first conduit means connecting the lower portions of said seal mounting chamber with the lower portions of said fluid expansion chamber;
   means for filling said seal mounting chamber and said expansion chamber with a motor protective fluid having a lighter density than well fluids; and
   second conduit means in said tubular housing assembly defining a fluid path for well fluids to surround the outer surface of said flexible annular diaphragm; whereby pressure differentials between well fluids and said motor protective fluid are equalized.

2. The apparatus of claim 1 further comprising means in said tubular housing assembly defining an annular, downwardly extending passage adjacent said shaft to transmit said motor protective fluid to the motor windings; and port means interconnecting said annular passage with said expansion chamber at a level substantially above the lower end of said second conduit means, thereby creating a labyrinth flow barrier for well fluids leaking into said seal mounting chamber.

3. The apparatus defined in claim 2 further comprising means in said tubular housing assembly defining an annular labyrinth chamber below said diaphragm chamber; third conduit means connecting the upper portions of said downwardly extending annular passage with the lower portions of said labyrinth chamber; a second shaft seal preventing downward flow of the protective fluid past said labyrinth chamber; means in said tubular housing assembly defining a second downwardly extending annular passage around said shaft extension communicating with the motor windings; a second port means connecting the upper portion of said second downwardly extending annular passage with the upper portions of said labyrinth chamber, thereby extablishing a second labyrinth fluid barrier for well fluids leaking into said seal mounting chamber.

4. The apparatus defined in claim 2 wherein said downwardly extending annular passage is defined by a tube mounted in said tubular housing assembly in radially spaced, concentric relationship to said shaft extension.

5. The apparatus defined in claim 3 wherein said first mentioned downwardly extending annular passage is defined by a tube mounted in said tubular housing assembly in radially spaced, concentric relationship to said shaft extension, and said second downwardly extending annular passage is defined by a second tube mounted in said tubular housing assembly below said second shaft seal in radially spaced, concentric relationship to said shaft extension.

* * * * *